(12) United States Patent
Kurokawa (10) Patent No.: US 8,967,704 B2
(45) Date of Patent: Mar. 3, 2015

(54) VEHICLE BODY SKELETON STRUCTURE

(75) Inventor: Hiroyuki Kurokawa, Nisshin (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 14/117,662

(22) PCT Filed: May 17, 2011

(86) PCT No.: PCT/JP2011/061334
§ 371 (c)(1),
(2), (4) Date: Nov. 14, 2013

(87) PCT Pub. No.: WO2012/157079
PCT Pub. Date: Nov. 22, 2012

(65) Prior Publication Data
US 2014/0077529 A1 Mar. 20, 2014

(51) Int. Cl.
*B60J 7/00* (2006.01)
*B62D 25/04* (2006.01)
*B62D 25/02* (2006.01)
*B62D 25/16* (2006.01)

(52) U.S. Cl.
CPC .............. *B62D 25/04* (2013.01); *B62D 25/025* (2013.01); *B62D 25/16* (2013.01)
USPC .................................................. 296/193.06

(58) Field of Classification Search
CPC .................... H01L 2924/0002; A63B 71/143; B62D 25/04; B62D 29/002; G06F 8/30; A61B 17/0643; A61B 17/0686; B61B 17/24; B61B 2017/2922; B01D 35/027
USPC ........... 296/187.03, 203.03, 193.05, 198, 209
See application file for complete search history.

(56) References Cited

U.S. PATENT DOCUMENTS

| | | | |
|---|---|---|---|
| 5,085,484 A * | 2/1992 | Mori | 296/204 |
| 5,641,194 A * | 6/1997 | Honma et al. | 296/203.03 |
| 6,193,306 B1 * | 2/2001 | Lee | 296/209 |
| 6,409,257 B1 * | 6/2002 | Takashina et al. | 296/209 |
| 6,709,045 B2 * | 3/2004 | Shuto et al. | 296/155 |

(Continued)

FOREIGN PATENT DOCUMENTS

| | | | |
|---|---|---|---|
| JP | S63-038084 A | 2/1988 | |
| JP | H06-001145 A | 1/1994 | |

(Continued)

*Primary Examiner* — Kiran B Patel
(74) *Attorney, Agent, or Firm* — Kenyon & Kenyon LLP (57) ABSTRACT

Obtained is a vehicle body skeleton structure having increased rigidity achieved without making the structure complex.

A skeleton body comprises a rocker rear, a rear pillar, and a rear wheel house which are joined together. An inner corner portion which forms a rocker reinforcement is formed on the inner side of a bent portion located near the joint portion. A bulging portion having a three-dimensional curved surface shape bulging in a convex shape is formed at the inner corner portion. The rocker reinforcement is formed in such a manner that an upper wall portion, an upper end flange portion, and a rear end standing wall portion are formed on the inner side of the bent portion so as to be directed in three directions and so as to continue to the bulging portion at a position at which the upper wall portion, the upper end flange portion, and the rear end standing wall portion surround the bulging portion. Also, the upper end flange portion is joined to both a rocker inner panel and a pillar inner panel, and the rear end standing wall portion is joined to a wheel house outer panel.

2 Claims, 5 Drawing Sheets

(56) References Cited

U.S. PATENT DOCUMENTS

| | | | |
|---|---|---|---|
| 7,032,959 B2* | 4/2006 | Berstecher et al. | 296/193.05 |
| 7,264,302 B2* | 9/2007 | Nagashima | 296/187.12 |
| 7,963,588 B2* | 6/2011 | Kanagai et al. | 296/187.12 |
| 8,002,339 B2* | 8/2011 | Rill et al. | 296/209 |
| 8,262,152 B2* | 9/2012 | Okumura et al. | 296/193.06 |
| 8,308,227 B2* | 11/2012 | Tsuruta et al. | 296/209 |
| 8,366,185 B2* | 2/2013 | Herntier | 296/209 |
| 8,465,088 B2* | 6/2013 | Bodin et al. | 296/193.06 |
| 8,668,250 B2* | 3/2014 | Klimek et al. | 296/193.05 |
| 8,684,449 B2* | 4/2014 | Bodin et al. | 296/193.06 |
| 8,746,786 B2* | 6/2014 | Pohl et al. | 296/209 |
| 2002/0190544 A1* | 12/2002 | Yamamoto et al. | 296/205 |
| 2007/0063546 A1* | 3/2007 | Lassl et al. | 296/193.06 |

FOREIGN PATENT DOCUMENTS

| | | |
|---|---|---|
| JP | 2008-000760 A | 1/2008 |
| JP | 2008-213826 A | 9/2008 |
| JP | 2009-241899 A | 10/2009 |

\* cited by examiner

VEHICLE BODY SKELETON STRUCTURE

CROSS REFERENCE TO RELATED APPLICATION

This is a national phase application based on the PCT International Patent Application No. PCT/JP2011/061334 filed on May 17, 2011, the entire contents of which are incorporated herein by reference.

TECHNICAL FIELD

The present invention relates to a vehicle body skeleton structure.

BACKGROUND ART

As a vehicle body skeleton structure, for example, there is a structure that forms and reinforces a closed cross-sectional structure of two vertical layers by a first reinforcement and a second reinforcement at the joined portion of the rocker rear end portion and the pillar lower end portion at a vehicle (refer to Patent Document 1 for example).

[Patent Document 1] Japanese Patent Application Laid-Open No. 2008-213826

DISCLOSURE OF INVENTION

Technical Problem

However, in this conventional technique, because a closed cross-sectional structure of two vertical layers is formed, the number of parts increases and the structure becomes complex.

In view of the above-described circumstances, an object of the present invention is to provide a vehicle body skeleton structure that can improve rigidity without complicating the structure.

Solution to Problem

A vehicle body skeleton structure relating to a first aspect of the present invention comprises: a skeleton body at which a plurality of skeleton portions are joined, and at which an inner corner portion is formed in a vicinity of a joined portion thereof; and a bulging portion that is formed at the inner corner portion, and that is shaped as a three-dimensional curve that bulges out in a convex form, wherein, at the skeleton body, due to a first skeleton portion and a second skeleton portion, that are respectively formed in elongated shapes, intersecting one another and being joined at respective longitudinal direction one end portion sides thereof, the first skeleton portion and the second skeleton portion form a bent portion in a range that includes an intersection portion thereof, the inner corner portion is disposed at an inner side of the bent portion, and the skeleton body has a reinforcing member at which the bulging portion is formed, and the reinforcing member has planar portions that are formed so as to be continuous with the bulging portion at positions that surround the bulging portion and that are directed in at least three directions, and any of the planar portions is joined to a portion of the first skeleton portion, and any other of the planar portions is joined to a portion of the second skeleton portion.

In accordance with the vehicle body skeleton structure relating to the first aspect of the present invention, at the skeleton body, plural skeleton portions are joined, and an inner corner portion is formed in a vicinity of the joined portion thereof. A bulging portion, which is shaped as a three-dimensional curve that bulges out in a convex form, is formed at the inner corner portion. Therefore, when force that is applied to the joined portion is transmitted to the bulging portion, that force is dispersed, and deformation whose starting point is the joined portion is suppressed.

In a second aspect of the present invention, in the vehicle body skeleton structure relating to the first aspect, at the skeleton body, due to a first skeleton portion and a second skeleton portion, that are respectively formed in elongated shapes, intersecting one another and being joined at respective longitudinal direction one end portion sides thereof, the first skeleton portion and the second skeleton portion form a bent portion in a range that includes an intersection portion thereof, the inner corner portion is disposed at an inner side of the bent portion, and the skeleton body has a reinforcing member at which the bulging portion is formed, and the reinforcing member has planar portions that are formed so as to be continuous with the bulging portion at positions that surround the bulging portion and that are directed in at least three directions, and any of the planar portions is joined to a portion of the first skeleton portion, and any other of the planar portions is joined to a portion of the second skeleton portion.

Further, at the skeleton body, the first skeleton portion and the second skeleton portion are respectively formed in elongated shapes, and intersect one another and are joined at respective longitudinal direction one end portion sides thereof. The bent portion is formed in a range that includes the intersection portion thereof, and is reinforced by the reinforcing member. At the reinforcing member, at the inner side of the bent portion, the inner corner portion is disposed and the bulging portion is formed, and planar portions that are continuous with the bulging portion are formed at positions surrounding the bulging portion and are directed in at least three directions. Any of the planar portions is joined to a portion of the first skeleton portion, and any other of the planar portions is joined to a portion of the second skeleton portion. Therefore, when force, that is applied to the joined portion of the any of the planar portions and the portion of the first skeleton portion, and to the joined portion of the any other of the planar portions and the portion of the second skeleton portion, is transmitted to the bulging portion of the reinforcing member, the force is dispersed into shearing force and axial force. Due thereto, due to the shearing force that deforms the bulging portion decreasing, deformation of the bulging portion and the joined portion at the periphery thereof is suppressed.

In a third aspect of the present invention, in the vehicle body skeleton structure relating to the first aspect, the first skeleton portion has a rocker inner panel that is disposed at a lower end portion of a vehicle body side portion with a vehicle body longitudinal direction being a longitudinal direction of the rocker inner panel, and the second skeleton portion has a wheel house outer panel that is joined to a rear end portion of the rocker inner panel, and the reinforcing member is a rocker reinforcement that is disposed at a vehicle transverse direction outer side of the rocker inner panel, and that, together with the rocker inner panel, forms a closed cross-section that runs along the vehicle body longitudinal direction, and that is joined to the wheel house outer panel.

In accordance with the vehicle body skeleton structure relating to the third aspect of the present invention, the rocker reinforcement that serves as the reinforcing member is disposed at the vehicle transverse direction outer side of the rocker inner panel that structures the first skeleton portion, and, together with the rocker inner panel, forms a closed cross-section that runs along the vehicle body longitudinal direction, and is joined to the wheel house outer panel that structures the second skeleton portion. Therefore, for example, even if force that collapses the wheel house outer panel in the vehicle transverse direction is applied with the rocker being the axis, due to the force being dispersed at the bulging portion of the rocker reinforcement, deformation in which the wheel house outer panel collapses-in in the vehicle transverse direction is suppressed.

Advantageous Effects of Invention

As described above, the vehicle body skeleton structure relating to the first aspect of the present invention has the excellent effect of being able to improve rigidity without complicating the structure.

Further, the vehicle body skeleton structure relating to the first aspect of the present invention has the excellent effect of being able to ensure rigidity and strength with respect to forces of plural directions to a vicinity of the joined portion.

The vehicle body skeleton structure relating to the third aspect of the present invention has the excellent effect of being able to suppress deformation in which the wheel house outer panel collapses-in in the vehicle transverse direction.

BEST MODES FOR CARRYING OUT THE INVENTION

First Embodiment

A vehicle body skeleton structure relating to a first embodiment is described by using FIG. 1 through FIG. 4. The first embodiment is an embodiment of the present invention. Note that arrow FR shown appropriately in these drawings indicates the vehicle front side, arrow UP indicates the vehicle upper side, and arrow OUT indicates the vehicle transverse direction outer side.

Figure 3:
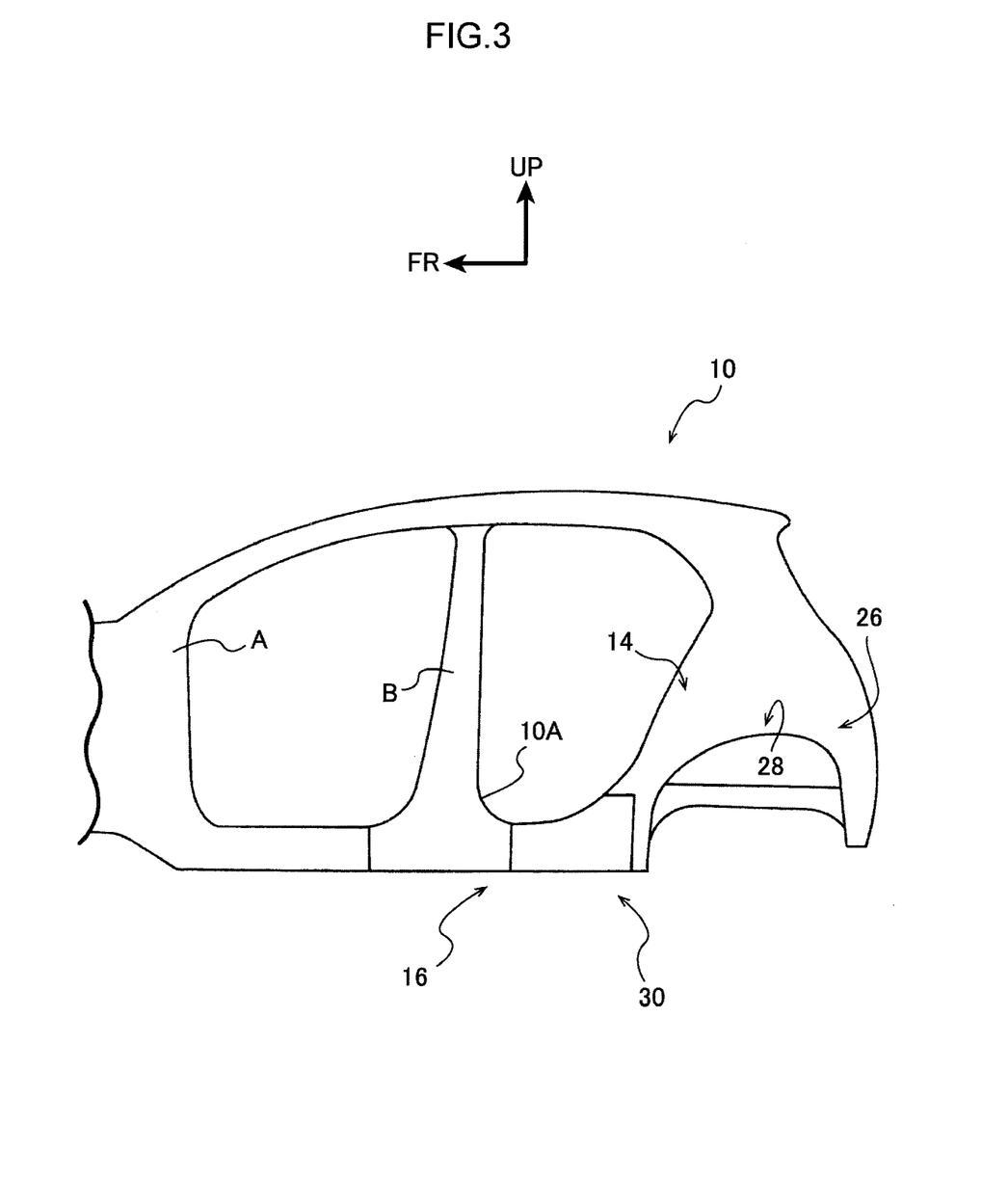
FIG. 3 is a schematic side view of a vehicle body to which the vehicle body skeleton structure relating to the first embodiment is applied.

A vehicle body, to which a vehicle body skeleton structure 30 relating to a first embodiment is applied, is shown in a schematic side view in FIG. 3. Note that the vehicle body skeleton structure in the present embodiment is a structure in which the joined portion of a rocker rear 16, a rear pillar 14 and a rear wheel house 26 of an automobile is reinforced.

As shown in FIG. 3, a rear side door opening portion 10A, that is opened and closed by an unillustrated rear side door, is formed in the rear side of a vehicle body side portion 10. The rocker rear 16 is disposed with the vehicle longitudinal direction being the longitudinal direction thereof, at the lower edge side of the rear side door opening portion 10A (the lower end portion of the vehicle body side portion 10). The front end portion of the rear wheel house 26 is joined to the rear end portion of the rocker rear 16. The rear wheel house 26 has an unillustrated wheel house inner panel (rear wheel house inner panel) that is disposed at the vehicle transverse direction inner side, and a wheel house outer panel (rear wheel house outer panel) 28 that serves as a second skeleton portion and is disposed at the vehicle transverse direction outer side. The region of the rear wheel house 26 from the upper portion side to the front end side is formed in the shape of a gradual curve toward the rear end portion side of the rocker rear 16. The front end portion of this rear wheel house 26 is joined to the lower end portion of the rear pillar 14.

Figure 1:
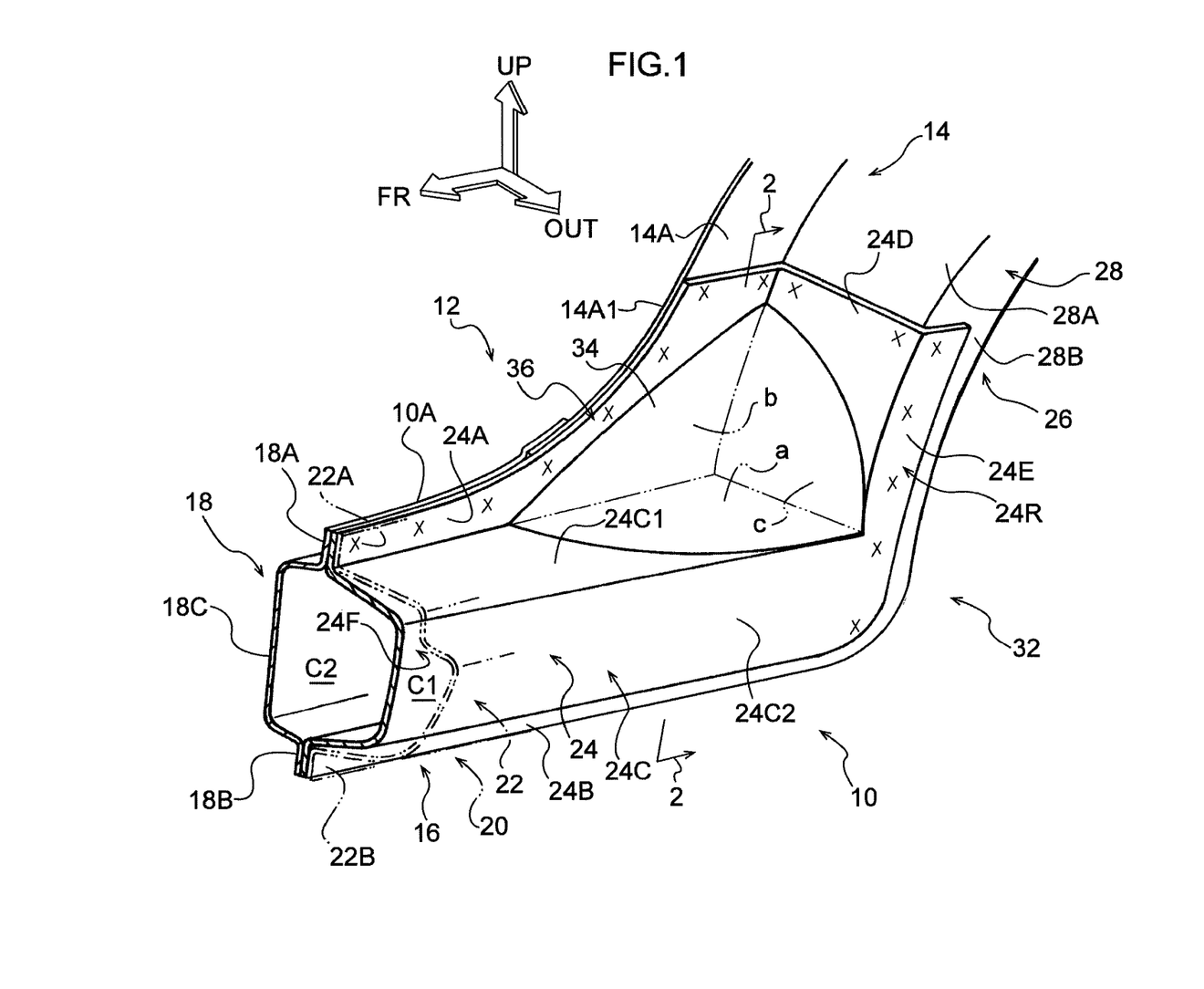
FIG. 1 is a perspective view showing a vehicle body skeleton structure relating to a first embodiment.

The main portions of the vehicle body skeleton structure 30 are shown in a perspective view in FIG. 1. Further, the state that is cut along line 2-2 of FIG. 1 is shown in an enlarged sectional view (a vertical sectional view) in FIG. 2. As shown in FIG. 1, a skeleton body 12, at which are joined the rocker rear 16, the rear pillar 14 and the rear wheel house 26 that serve as plural skeleton portions, is formed at the vehicle body skeleton structure 30 of the present embodiment. The rocker rear 16 has a rocker inner panel (rocker rear inner panel) 18 that serves as a first skeleton portion, and a rocker outer panel (rocker rear outer panel) 22. The rocker inner panel 18 is disposed at the vehicle transverse direction inner side at the rocker rear 16, and is formed in a substantial hat shape in cross-section whose vehicle transverse direction outer side is open. In contrast, the rocker outer panel 22 is disposed at the vehicle transverse direction outer side at the rocker rear 16, and is formed in a substantial hat shape in cross-section whose vehicle transverse direction inner side is open.

The rocker inner panel 18 is formed in an elongated shape whose longitudinal direction is the vehicle longitudinal direction, and is joined to the lower end portion of a pillar inner panel 14A of the rear pillar 14. In contrast, the pillar inner panel 14A extends toward the vehicle body upper side and is formed in an elongated shape. Further, the rocker outer panel 22 is a portion of a side outer panel 20, and is structured integrally with a pillar outer panel 14B (see FIG. 2) of the rear pillar 14. The portion that is formed in an elongated shape whose longitudinal direction is the vehicle longitudinal direction is the rocker outer panel 22, and the portion that extends toward the vehicle body upper side and is formed in an elongated shape is the pillar outer panel 14B (see FIG. 2). Note that FIG. 1 illustrates a state in which the greater part of the side outer panel 20 is removed, and only a portion of the rocker outer panel 22 is illustrated by the two-dot chain lines in a see-through state.

The rocker rear 16 is structured as a closed cross-sectional structure basically due to an upper end flange portion 18A of the rocker inner panel 18 and an upper end flange portion 22A of the rocker outer panel 22 being joined by spot welding, and a lower end flange portion 18B of the rocker inner panel 18 and a lower end flange portion 22B of the rocker outer panel 22 being joined by spot welding respectively. Namely, there is a structure in which a closed cross-sectional portion C1 is formed by the rocker inner panel 18 and the rocker outer panel 22. Further, a flange portion (not illustrated), that is overlapped with and joined to the lower end portion of the front surface of a front end portion 28A at the wheel house outer panel 28, is formed at the rear end of the rocker inner panel 18.

Note that the final end portion at the vehicle transverse direction outer side of a rear floor pan (not illustrated) is joined by spot welding to the upper surface side of a projecting portion 18C toward the vehicle transverse direction inner side that is formed at the intermediate portion in the height direction of the rocker inner panel 18.

Here, a rocker reinforcement (a rocker rear outer lower reinforcement) 24 that serves as an elongated reinforcing member is disposed at the vehicle transverse direction inner side of the above-described rocker outer panel 22 and the vehicle transverse direction outer side of the rocker inner panel 18. The front portion of the rocker reinforcement 24 is disposed with the vehicle body longitudinal direction being the longitudinal direction thereof, and the front portion side is formed in a substantial hat shape in cross-section whose vehicle transverse direction inner side is open. A front end portion 24F of the rocker reinforcement 24 is disposed at a predetermined position near the front end of the lower edge of the rear side door opening portion 10A, and a rear end portion 24R of the rocker reinforcement 24 is disposed at the front end portion 28A side of the wheel house outer panel 28. Further, a projecting portion 24C, that projects-out toward the vehicle transverse direction outer side, is formed at an intermediate portion in the height direction of the rocker reinforcement 24, and an upper end flange portion 24A serving as a planar portion is formed at the upper end portion of the rocker reinforcement 24, and a lower end flange portion 24B is formed at the lower end portion of the rocker reinforcement 24.

The front portion of the upper end flange portion 24A of the rocker reinforcement 24 is joined by spot welding (the welding points are shown by the "X" marks) in three superposed layers with the front portion of the upper end flange portion 24A being nipped between the upper end flange portion 18A of the rocker inner panel 18 and the upper end flange portion 22A of the rocker outer panel 22. Further, the rear portion of the upper end flange portion 24A of the rocker reinforcement 24 is joined by spot welding (the welding points are shown by the "X" marks) while being superposed with a front end flange 14A1 of the pillar inner panel 14A. On the other hand, the lower end flange portion 24B of the rocker reinforcement 24 is joined by spot welding in three superposed layers with the lower end flange portion 24B being nipped between the lower end flange portion 18B of the rocker inner panel 18 and the lower end flange portion 22B of the rocker outer panel 22. Due thereto, the rocker reinforcement 24, together with the rocker inner panel 18, forms a closed cross-section C2 that runs along the vehicle body longitudinal direction.

The rear portion of the upper end flange portion 24A of the rocker reinforcement 24 extends at an incline toward the upper side of the vehicle body toward the vehicle body rear side. Further, a rear end standing wall portion 24D, that serves as a planar portion and that is folded over from the rear end portion of the upper end flange portion 24A toward the vehicle transverse direction outer side, is formed at the rocker reinforcement 24. The rear end standing wall portion 24D is joined by spot welding (the welding points are shown by the "X" marks) to the front end portion 28A of the wheel house outer panel 28. Moreover, a rear end flange portion 24E, that is folded-over from the vehicle transverse direction outer side end portion of the rear end standing wall portion 24D toward the vehicle rear side, is formed at the rocker reinforcement 24. The rear end flange portion 24E is continuous with the rear end portion of a vertical wall portion 24C2 of the projecting portion 24C, and is joined by spot welding (the welding points are shown by the "X" marks) to a front end side wall portion 28B, that is directed toward the vehicle transverse direction outer side, at the front end side of the wheel house outer panel 28.

By the way, at the skeleton body 12 of the present embodiment, due to the rocker inner panel 18 and the wheel house outer panel 28 intersecting one another (substantially orthogonally) and being joined at respective longitudinal direction one end portion sides thereof, a bent portion 32 is formed at a range that includes this intersection portion. Further, at the radial direction inner side of the bent portion 32, an upper wall portion 24C1, that serves as a planar portion of the upper surface side of the projecting portion 24C, and the rear end standing wall 24D, are disposed, and an inner corner portion 36 is formed. The inner corner portion 36 structures a portion of the rocker reinforcement 24, and is disposed at the radial direction inner side of the bent portion 32, and is formed in a vicinity of the joined portion where the rocker rear 16, the rear pillar 14 and the rear wheel house 26 are joined.

Here, a bulging portion 34, that is a three-dimensional curved shape (more concretely, a substantially spherical shape) and that bulges out in a convex form, is formed at the inner corner portion 36 of the rocker reinforcement 24. In this way, the rocker reinforcement 24 has the bulging portion 34, and the upper wall portion 24C1, the upper end flange portion 24A and the rear end standing wall portion 24D are formed so as to be continuous with the outer peripheral portion of the bulging portion 34 at positions surrounding the bulging portion 34, and are directed in three directions.

Figure 2:
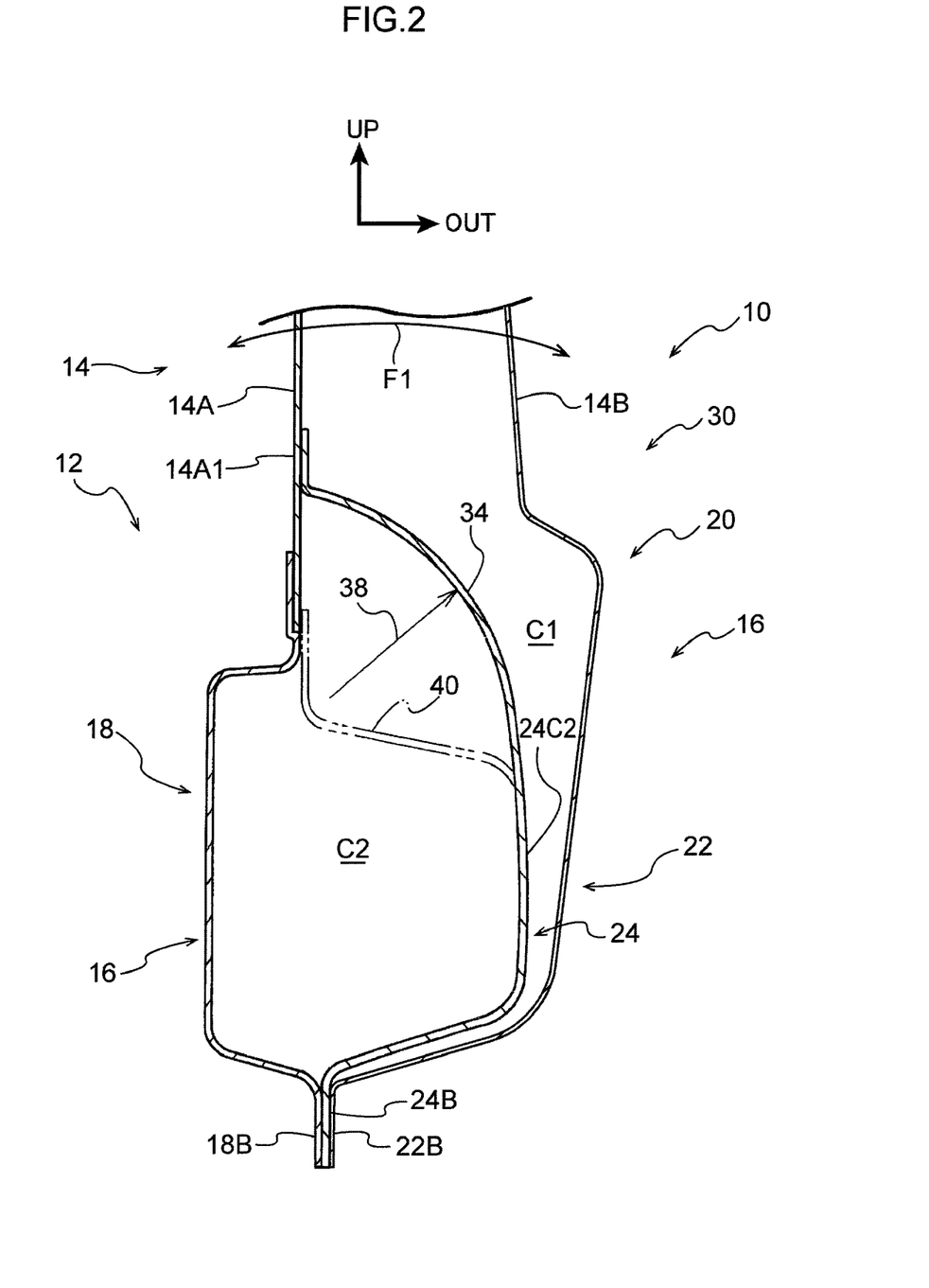
FIG. 2 is an enlarged sectional view (a vertical sectional view) showing a state cut along line 2-2 of FIG. 1.

Note that it is preferable that the bulging portion 34 be a shape that is as near to a spherical shape as possible. Further, although the bulging portion 34 is formed in the shape of a three-dimensional curve in the present embodiment, as a reference example that is not the present invention, the bulging portion 34 may be formed in the shape of a polygon that approximates a three-dimensional curved shape. Further, a two-dot chain line 40 shown in FIG. 2 illustrates the position of an upper wall portion of a rocker reinforcement in a comparative structure. The bulging portion 34 of the present embodiment bulges out also obliquely toward the upper side and vehicle transverse direction outer side from the upper wall portion 40 of this comparative structure.

(Operation/Effects)

The operation and effects of the above-described embodiment are described next.

In accordance with the vehicle body skeleton structure 30 relating to the present embodiment, at the skeleton body 12 shown in FIG. 1, the rocker rear 16, the rear pillar 14 and the rear wheel house 26 are joined, and the inner corner portion 36 that structures the rocker reinforcement 24 is formed at the inner side of the bent portion 32 in the vicinity of this joined portion. The bulging portion 34, that is shaped as a three-dimensional curve and bulges out convexly, is formed at the inner corner portion 36. Therefore, when force that is applied to the joined portion is transmitted to the bulging portion 34 of the rocker reinforcement 24, that force is dispersed.

Further, the rocker reinforcement 24, together with the rocker inner panel 18, fowls the closed cross-section C2 that runs along the vehicle body longitudinal direction, and the upper wall portion 24C1, the upper end flange portion 24A and the rear end standing wall portion 24D are formed so as to be continuous with the bulging portion 34 at positions that surround the bulging portion 34, and so as to be directed in three directions. Further, the upper end flange portion 24A is joined to the upper end flange portion 18A of the rocker inner panel 18 and the front end flange 14A1 of the pillar inner panel 14A, and the rear end standing wall portion 24D is joined to the front end portion 28A of the wheel house outer panel 28. Therefore, the force that is applied to the joined portion of the upper end flange portion 24A of the rocker reinforcement 24 and the upper end flange portion 18A of the rocker inner panel 18, and to the joined portion of the upper end flange portion 24A of the rocker reinforcement 24 and the front end flange 14A1 of the pillar inner panel 14A, and to the joined portion of the rear end standing wall portion 24D of the rocker reinforcement 24 and the front end portion 28A of the wheel house outer panel 28, is dispersed into shearing force and axial force at the bulging portion 34 of the rocker reinforcement 24.

Figure 4:
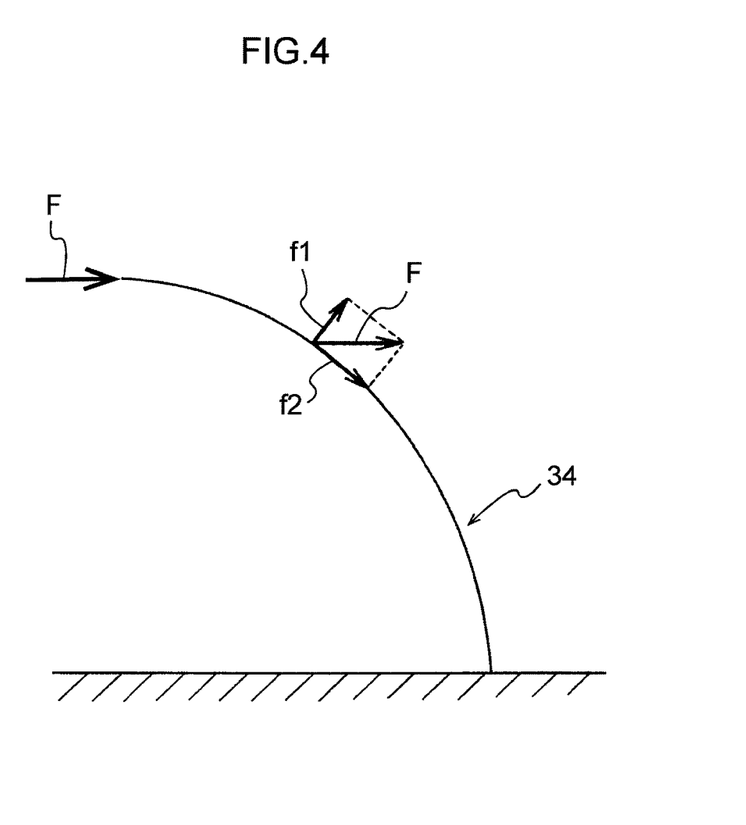
FIG. 4 is a schematic drawing showing the decomposition of force that is applied to a bulging portion of the vehicle body skeleton structure relating to the first embodiment.

The decomposition of force at the bulging portion 34 is shown schematically in FIG. 4. As shown in FIG. 4, force F that is applied is decomposed into shearing force f1 and axial force f2 at the bulging portion 34. Due thereto, due to the shearing force f1, that deforms the bulging portion 34, becoming small, deformation of the bulging portion 34 and the joined portion at the periphery thereof is suppressed. Namely, the joining rigidity and strength improve.

For example, even if force that collapses the rear wheel house 26 and the rear pillar 14 in the vehicle transverse direction is applied with the rocker rear 16 shown in FIG. 1 being the axis, due to the force being dispersed at the bulging portion 34 of the rocker reinforcement 24, deformation in which the rear wheel house 26 and the rear pillar 14 collapse-in in the vehicle transverse direction is suppressed. Namely, the rigidity with respect to the moment is increased. As a result, vibration of the vehicle body due to an improvement in the vehicle body rigidity is suppressed, and an improvement in the steering stability and a suppression of deformation at the time of a collision are realized.

Here, supplemental description is given of the load that attempts to deform the joined portion of the rocker rear 16 and the rear pillar 14. Due to input from the rear suspension or vibrations from the engine or the like, load is applied to the joined portion of the rocker rear 16 and the rear pillar 14. It is thought that, due to such load, the rear pillar 14 will torsionally deform with respect to the rocker rear 16 or that the vehicle body will deform into a parallel quadrilateral shape as seen in a vehicle front view, and, the lower the joining rigidity of the rear pillar 14 with respect to the rocker rear 16, the greater that these types of deformation become. In other words, when the joining rigidity of the rocker rear 16 and the rear pillar 14 is strengthened with respect to the moment around an axis in the vehicle body longitudinal direction as in the present embodiment, the amount of deformation at the time of load input is suppressed.

Further, focusing on the joined portion of the rocker rear 16 and the rear pillar 14, with respect to the rocker rear 16 that extends in the vehicle body longitudinal direction (the substantially horizontal direction), the rear pillar 14 is widened into a shape in which the end widens in the vehicle body longitudinal direction toward the vehicle body lower portion side, and is joined to the rocker rear 16. Therefore, cases can also be thought of in which, generally, if the joined portion is not reinforced by a separate reinforcing member, it is easy for the joined portion to deform with respect to load F1 (see FIG. 2) that collapses the rear pillar 14 in the vehicle transverse direction with the rocker rear 16 as the axis. In contrast, in the present embodiment, by forming the bulging portion 34 and the like at the rocker reinforcement 24 as described above, the rigidity of the joined portion of the rocker rear 16 and the rear pillar 14 is increased while an increase in the number of parts is suppressed.

Further, when comparing the upper and lower regions of each of a front pillar A, a center pillar B and the rear pillar 14 that are shown in FIG. 3, it can be understood that the region, where the contribution ratio to restoration with respect to deformation around an axis in the vehicle body longitudinal direction is the greatest, is the lower portion of the rear pillar 14. Therefore, it can be said that reinforcement by the bulging portion 34 and the like of the present embodiment is extremely effective reinforcement.

Moreover, when compared with comparative structures, for example, in a first comparative structure that connects the upper wall portion 24C1, the upper end flange portion 24A and the inner peripheral side of the rear end standing wall portion 24D by a region that is shaped as a flat-plate triangular surface that does not bulge-out instead of the bulging portion 34 shown in FIG. 1, and in a second comparative structure in which, instead of the bulging portion 34, the upper wall portion 24C1, the upper end flange portion 24A and the rear end standing wall portion 24D are respectively extended in planar shapes and are made to intersect one another (the extended planar portions are shown by the two-dot chain lines and are indicated by reference letters a, b, c in FIG. 1), the force that is applied cannot be dispersed into shearing force and axial force. Therefore, the first comparative structure and the second comparative structure deform easily as compared with the structure relating to the present embodiment. For example, in a case in which, at the structure relating to the present embodiment and at the first comparative structure and at the second comparative structure, load that deforms the rear pillar 14 so as to collapse the rear pillar 14 in the vehicle transverse direction is inputted given that conditions other than the shapes, such as the materials, the plate thicknesses, the constraints and the like are the same, in accordance with results of analysis by CAE, there becomes (deformation amount of structure relating to present embodiment):(deformation amount of first comparative structure):(deformation amount of second comparative structure)=1:3:10.

Note that, when viewed from another standpoint, in a case in which, for example, load is applied from the outer side to a vicinity of the center of the bulging portion 34 shown in FIG. 1, a cancelling moment is generated with respect to the moment due to that load, due to supporting point reaction forces respectively being applied toward the central direction of the bulging portion 34 to the bulging portion 34 from the supporting points that support the bulging portion 34. Therefore, even if such a load were to be applied to the bulging portion 34, it would be difficult for deformation to arise at the bulging portion 34.

As described above, in accordance with the vehicle body skeleton structure 30 relating to the present embodiment, the rigidity can be improved without complicating the structure. Further, the number of parts is kept down, and lightening of weight can be devised. Moreover, it can be said that the vehicle body skeleton structure 30 is a structure that is suited to low energy manufacturing as well.

Note that, in the above-described first embodiment, at the rocker reinforcement 24, the upper wall portion 24C1, the upper end flange portion 24A and the rear end standing wall portion 24D are formed continuously with the bulging portion 34 at positions that surround the bulging portion 34 at the inner side of the bent portion 32, and are directed in three directions. However, for example, depending on the shape and the like of the first skeleton portion and the second skeleton portion, at the reinforcing member, planar portions that are formed continuously with the bulging portion at positions that surround the bulging portion at the inner side of the bent portion may be directed in four or more directions.

Second Embodiment

A vehicle body skeleton structure relating to a second embodiment is described next by using FIG. 5. The second embodiment is a reference example, and is not an embodiment of the present invention. A vehicle body skeleton structure 50 relating to the second embodiment is illustrated in a perspective view in FIG. 5.

Figure 5:
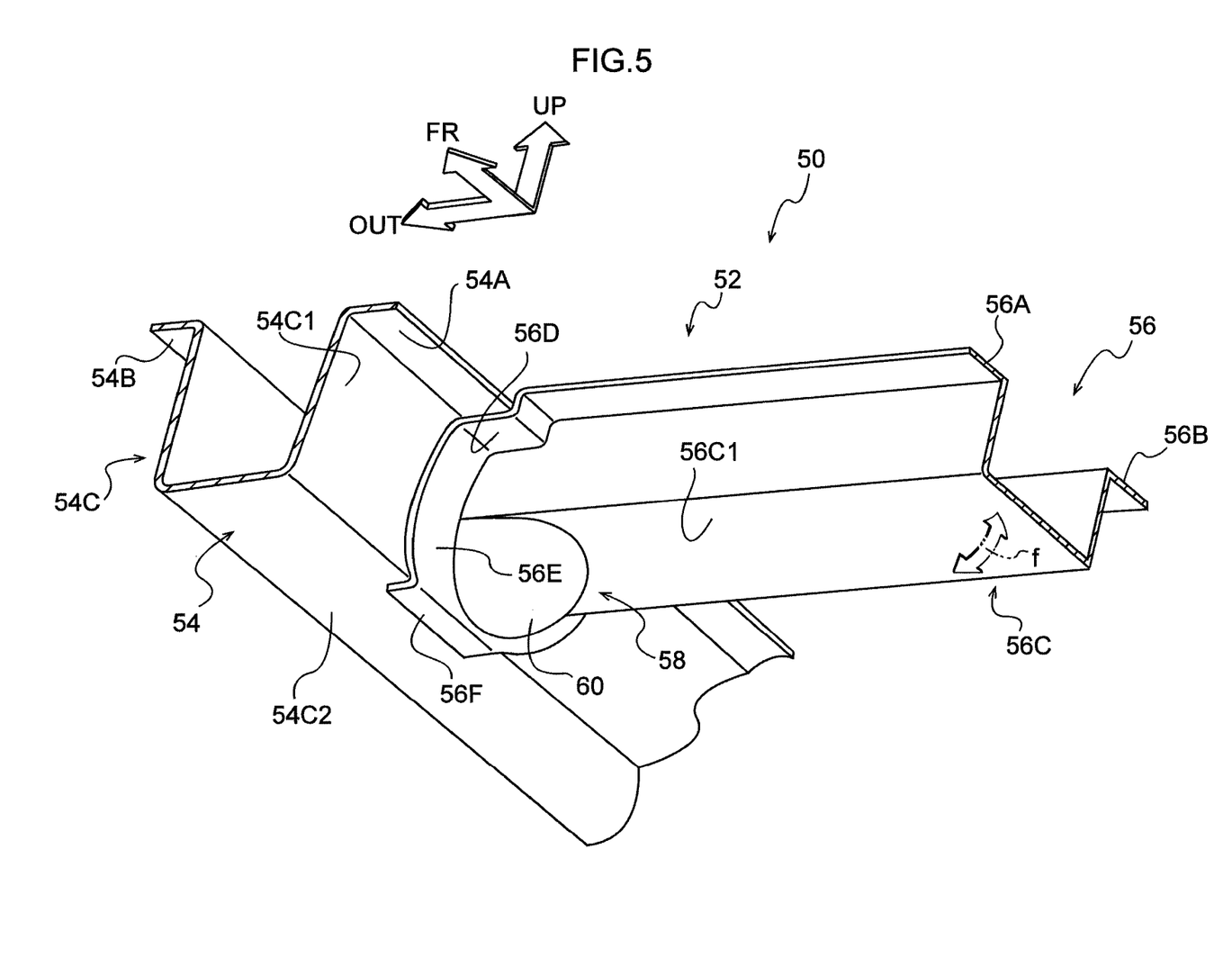
FIG. 5 is a perspective view showing a vehicle body skeleton structure relating to a second embodiment.

As shown in FIG. 5, a skeleton body 52, at which are joined a side member 54 and a cross member 56 that serve as plural skeleton portions, is formed at the vehicle body skeleton structure 50. The side member 54 is disposed at both sides in the vehicle transverse direction of the vehicle body, with the vehicle body longitudinal direction being the longitudinal direction thereof. The side member 54 is formed in a substantial hat shape in cross-section whose vehicle upper side is open, and has a pair of left and right flange portions 54A, 54B, and a projecting portion 54C that projects toward the vehicle lower side. The cross member 56 is disposed, with the vehicle transverse direction being the longitudinal direction thereof, between the vehicle longitudinal direction intermediate portions of the pair of left and right side members 54.

The cross member 56 is formed in a substantial hat shape in cross-section whose vehicle upper side is open, and has a pair of left and right flange portions 56A, 56B, and a projecting portion 56C that projects toward the vehicle lower side. The longitudinal direction end portions of the cross member 56 are made to abut the side members 54 and are joined thereto by welding.

First flanges 56D, that are a step lower than the flange portions 56A, 56B, are formed at the longitudinal direction end portions of the cross member 56. The first flange 56D is overlapped with, from the lower surface side, and joined to the flange portion 54A that is at the vehicle transverse direction inner side of the side member 54. Further, second flanges 56E, that are continuous with the end portions at the vehicle transverse direction outer sides of the first flanges 56D and are bent toward the vehicle lower side, are formed at the longitudinal direction end portions of the cross member 56. The second flange 56E is formed in a substantial U-shape as seen from the vehicle transverse direction inner side, and is overlapped with and joined to a vertical wall portion 54C1 at the vehicle transverse direction inner side of the projecting portion 54C of the side member 54. Moreover, third flanges 56F, that are continuous with the vehicle lower side end portions of the second flanges 56E and are bent toward the vehicle transverse direction outer sides, are formed at the longitudinal direction end portions of the cross member 56. The third flange 56F is overlapped with and joined to a portion of a bottom wall portion 54C2 of the projecting portion 54C of the side member 54.

An inner corner portion 58 is formed in a vicinity of the joined portion at which the side member 54 and the cross member 56 are joined, in a range that includes the second flange 56E side and the floor wall portion 56C1 side at the projecting portion 56C of the cross member 56. A bulging portion 60, that is a three-dimensional curved shape (more concretely, a substantially spherical shape) and that bulges out in a convex form, is formed at the inner corner portion 58.

It is preferable that the bulging portion 60 be a shape that is as near to a spherical shape as possible. Further, in the present embodiment, the bulging portion 60 is formed in the shape of a three-dimensional curve, but may be formed in the shape of a polygon that approximates a three-dimensional curved shape.

In the present embodiment, when there is input to the central portion of the cross member 56 from the suspension (not illustrated) or from a suspended heavy load (not illustrated), force f thereof attempts to displace the cross member 56 with the side member 54 as the axis. However, in the same way as in the first embodiment, at the joined portion of the side member 54 and the cross member 56, the moment rigidity improves due to the bulging portion 60, and therefore, deformation whose starting point is the joined portion is suppressed.

Note that the above-described embodiments and the above-described modified examples can be implemented by being combined appropriately.

The invention claimed is:

1. A vehicle body skeleton structure comprising:
a skeleton body at which a plurality of skeleton portions are joined, and at which an inner corner portion is formed in a vicinity of a joined portion thereof; and
a bulging portion that is formed at the inner corner portion, and that is shaped as a three-dimensional curve that bulges out in a convex form,
wherein, at the skeleton body, due to a first skeleton portion and a second skeleton portion, that are respectively formed in elongated shapes, intersecting one another and being joined at respective longitudinal direction one end portion sides thereof, the first skeleton portion and the second skeleton portion form a bent portion in a range that includes an intersection portion thereof, the inner corner portion is disposed at an inner side of the bent portion, and the skeleton body has a reinforcing member at which the bulging portion is formed, and
the reinforcing member has planar portions that are formed so as to be continuous with the bulging portion at positions that surround the bulging portion and that are directed in at least three directions, and any of the planar portions is joined to a portion of the first skeleton portion, and any other of the planar portions is joined to a portion of the second skeleton portion.

2. The vehicle body skeleton structure of claim 1, wherein the first skeleton portion has a rocker inner panel that is disposed at a lower end portion of a vehicle body side portion with a vehicle body longitudinal direction being a longitudinal direction of the rocker inner panel, and the second skeleton portion has a wheel house outer panel that is joined to a rear end portion of the rocker inner panel, and
the reinforcing member is a rocker reinforcement that is disposed at a vehicle transverse direction outer side of the rocker inner panel, and that, together with the rocker inner panel, forms a closed cross-section that runs along the vehicle body longitudinal direction, and that is joined to the wheel house outer panel.

\* \* \* \* \*

UNITED STATES PATENT AND TRADEMARK OFFICE
CERTIFICATE OF CORRECTION

| | | |
|---|---|---|
| PATENT NO. | : 8,967,704 B2 | Page 1 of 1 |
| APPLICATION NO. | : 14/117662 | |
| DATED | : March 3, 2015 | |
| INVENTOR(S) | : H. Kurokawa | |

It is certified that error appears in the above-identified patent and that said Letters Patent is hereby corrected as shown below:

In the Specification

At column 6, line 32, change "outerside from the" to -- outerside (in the direction of arrow 38) from the --.

At column 6, line 49, change "panel 18, fowls the closed" to -- panel 18, forms the closed --.

Signed and Sealed this
Tenth Day of November, 2015

Michelle K. Lee
*Director of the United States Patent and Trademark Office*